United States Patent
Bible et al.

(10) Patent No.: US 12,521,946 B2
(45) Date of Patent: Jan. 13, 2026

(54) BOND ASSEMBLY JIG PREPARATION METHODS USING THERMOSETTING BISMALEIMIDE RESINS

(71) Applicant: THE BOEING COMPANY, Arlington, VA (US)

(72) Inventors: George E. Bible, Chesterfield, MO (US); Peter M. Winzek, Clayton, MO (US)

(73) Assignee: The Boeing Company, Arlington, VA (US)

( * ) Notice: Subject to any disclaimer, the term of this patent is extended or adjusted under 35 U.S.C. 154(b) by 137 days.

(21) Appl. No.: 18/530,646

(22) Filed: Dec. 6, 2023

(65) Prior Publication Data

US 2024/0190090 A1    Jun. 13, 2024

Related U.S. Application Data

(60) Provisional application No. 63/387,099, filed on Dec. 13, 2022.

(51) Int. Cl.
*B29C 70/54* (2006.01)

(52) U.S. Cl.
CPC .... *B29C 70/545* (2013.01); *B29C 2793/0054* (2013.01); *B29C 2793/0081* (2013.01)

(58) Field of Classification Search
CPC .... B29C 2793/0081; B29C 2793/0054; B29C 70/545
See application file for complete search history.

(56) References Cited

U.S. PATENT DOCUMENTS

2020/0207039 A1* 7/2020 Hicks .................. B64F 5/40

* cited by examiner

*Primary Examiner* — Vishal I Patel
(74) *Attorney, Agent, or Firm* — Joseph M. Butscher; The Small Patent Law Group LLC

(57) ABSTRACT

A method for preparing a bond assembly jig (BAJ) includes forming a cutter relief groove in the BAJ, filling the cutter relief groove of the BAJ with a material, and curing the material after said filling.

20 Claims, 4 Drawing Sheets

BOND ASSEMBLY JIG PREPARATION METHODS USING THERMOSETTING BISMALEIMIDE RESINS

CROSS-REFERENCE TO RELATED APPLICATIONS

This application is a non-provisional conversion of, and claims priority to, U.S. Provisional Patent Application No. 63/387,099, filed Dec. 13, 2022, which is incorporated by reference in its entirety.

FIELD OF THE DISCLOSURE

Examples of the present disclosure generally relate to bond assembly jig preparation methods using thermosetting bismaleimide (BMI) resins.

BACKGROUND OF THE DISCLOSURE

Bond assembly jigs (BAJs) are used to ensure proper positioning of components in relation to insertion of fasteners (such as bolts). BAJs are used as a guide for performing accurate operations in relation to components.

Current preparation of a BAJ typically involves filling a cutter relief groove during part layup with part material. Once the part is cut off the tool, a new cut mark made in the filled cutter groove is filled with a material, such as Epocast. The process can be repeated, such as for six to eight parts.

As can be appreciated, the process is time and labor intensive. For example, the Epocast material can be difficult to clean off the part. Further, the process of cleaning the cutter relief groove takes a significant amount of time.

SUMMARY OF THE DISCLOSURE

A need exists for an improved method for preparing a bond assembly jig (BAJ). Further, a need exists for an efficient and effective method for forming a part with a BAJ.

With those needs in mind, certain examples of the present disclosure provide a method for preparing a bond assembly jig (BAJ). The method includes forming a cutter relief groove in the BAJ, filling the cutter relief groove of the BAJ with a material, and curing the material after said filling.

In at least one example, the material includes a bismaleimide (BMI) resin. The material does not include Epocast material.

The cutter relief groove extends from an exposed surface of the BAJ into a main body of the BAJ.

The method can also include cleaning the cutter relief groove with a solvent before said filling.

The material can include a plurality of overlaid strips.

In at least one example, said filling includes overfilling the cutter relief groove with the material.

In at least one example, the method also includes before said curing, covering an exposed surface of the material with a release film and a caul sheet. The method can also include sealing outer perimeter edges of the caul sheet with a tape.

The method also includes laying up a part on the BAJ after said curing.

In at least one example, the method also includes forming a groove in the part and the material. The portion of the groove formed in the material provides a sub-groove. In at least one example, the method also includes removing the part from the BAJ after said forming the groove. In at least one example, the method also includes depositing preg material into the sub-groove after said removing.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Certain examples of the present disclosure provide a method for preparing a bond assembly jig (BAJ) assembly. The method includes filling a cutter relief groove of the BAJ with a material, curing the material, and laying up a part on the BAJ after the curing step.

Examples of the present disclosure provide methods for preparing a bond assembly jig (BAJ) that includes filling a BAJ cutter relief groove with a material such as a bismaleimide (BMI) resin (for example, MMS5047), and curing the material in place prior to part layup. The part, which can be made of MMS5024, is placed on top of the cured MMS5047 and manufactured as normal. Once the part is trimmed while on the tool/assembly, a new cut mark made in the MMS5047 filled cutter groove is filled with MMS5024 material that has been stacked, cut, filled, and compacted. The part is then ready for reuse. The methods described herein reduce time and effort spent preparing a BAJ between cures.

As described herein, the method uses a BMI material, such as MMS5047, to prepare a BAJ. Compared with known Epocast material, the BMI material lasts longer, is easier to replace, and effectively and efficiently fills a cutter relief groove. The use of MMS5047 high temperature material extends the duration between removal and replacement of the material in the main channel. The use of MMS5024 to replace the Epocast in the cutter groove allows the filling of the cutter groove inside a clean room in less time than would take for Epocast to cure.

Figure 1:
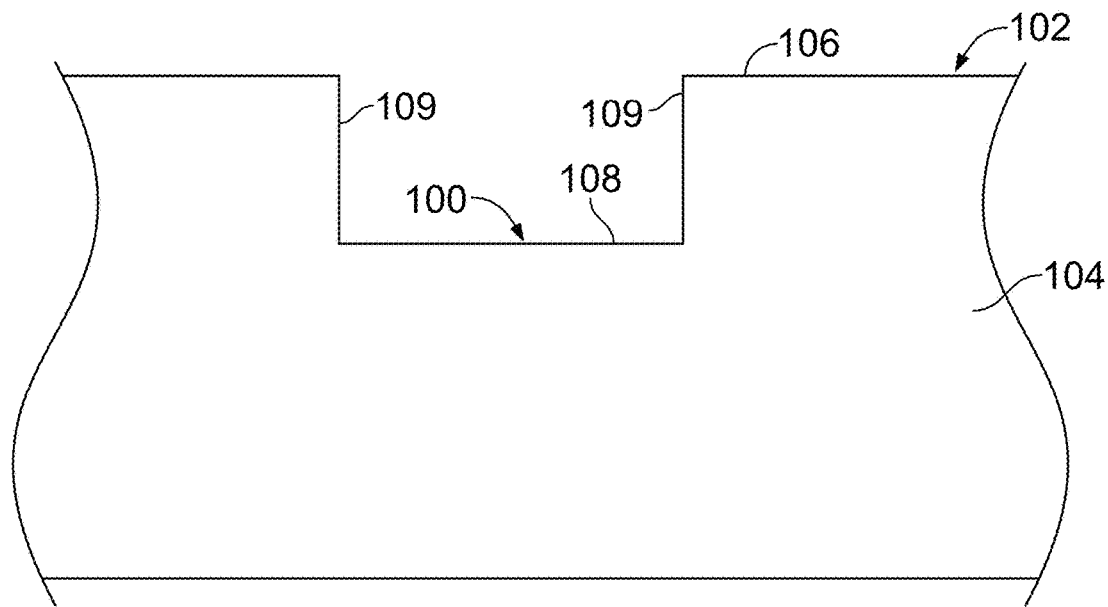
FIG. 1 illustrates a lateral view of a cutter relief groove formed in a bond assembly jig (BAJ), according to an example of the present disclosure.

FIG. 1 illustrates a lateral view of a cutter relief groove 100 formed in a bond assembly jig (BAJ) 102, according to an example of the present disclosure. As an example, the BAJ 102 is a 3BAJ bond jig. The BAJ 102 includes a main body 104 having an exposed surface 106, such as a top surface. The cutter relief groove 100 is formed in the exposed surface 106, such as through a cutting process (such as by a saw, milling tool, drill, or the like). The cutter relief groove 100 extends from the exposed surface 106 into the main body 104. The cutter relief groove 100 is defined by a base 108 and walls 110 upwardly extending from the base 108 to the exposed surface 106.

After the cutter relief groove 100 is formed in the BAJ 102, the cutter relief groove 100 is cleaned with a solvent. An example of the solvent is an MCS 6000 Type II Class A solvent (for example, Desoclean) to prepare for bonding.

Figure 2:
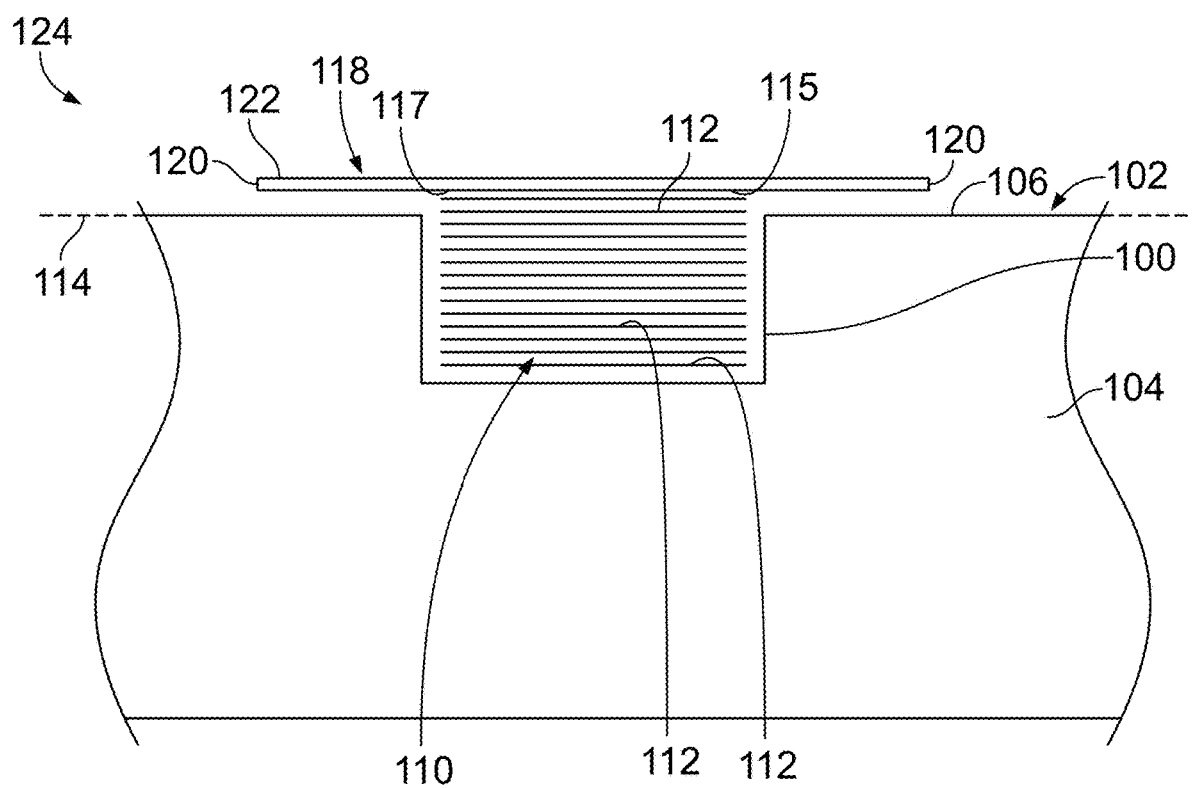
FIG. 2 illustrates a lateral view of a material deposited into the cutter relief groove of the BAJ, according to an example of the present disclosure.

FIG. 2 illustrates a lateral view of a material 110 deposited into the cutter relief groove 100 of the BAJ 102, according to an example of the present disclosure. In at least one example, the material 110 can be a plurality of overlaid strips 112. As an example, the strips 112 can be MMS 5047 Type 1 (CYCOM 5250-4, AS-4 6K Give Harness Satin). As shown in FIG. 2, the cutter relief groove 100 is over-filled with the material 110. In particular, the strips 112 extend over a plane 114 of the exposed surface 106 of the BAJ 102. As such, the cutter relief groove 110 is over-filled with the material 110.

After the cutter relief groove 110 is over-filled with the material 110, an exposed surface 115 (such as a top surface) of the material 110 is covered with a release film 117 (such as A4000 release film) and a caul sheet 118. Outer perimeter edges 120 of the caul sheet 118 can then be sealed with a tape 122, such as 855 tape. In this manner, an assembly 124 including the BAJ 102, the material 110 within the cutter relief groove 110, the release film 117, the caul sheet 118, and the tape 122 is formed.

Next, the assembly 124 is then cured, such as per PS14290 Cure Cycle 31. Optionally, the assembly 124 is not post cured.

Figure 3:
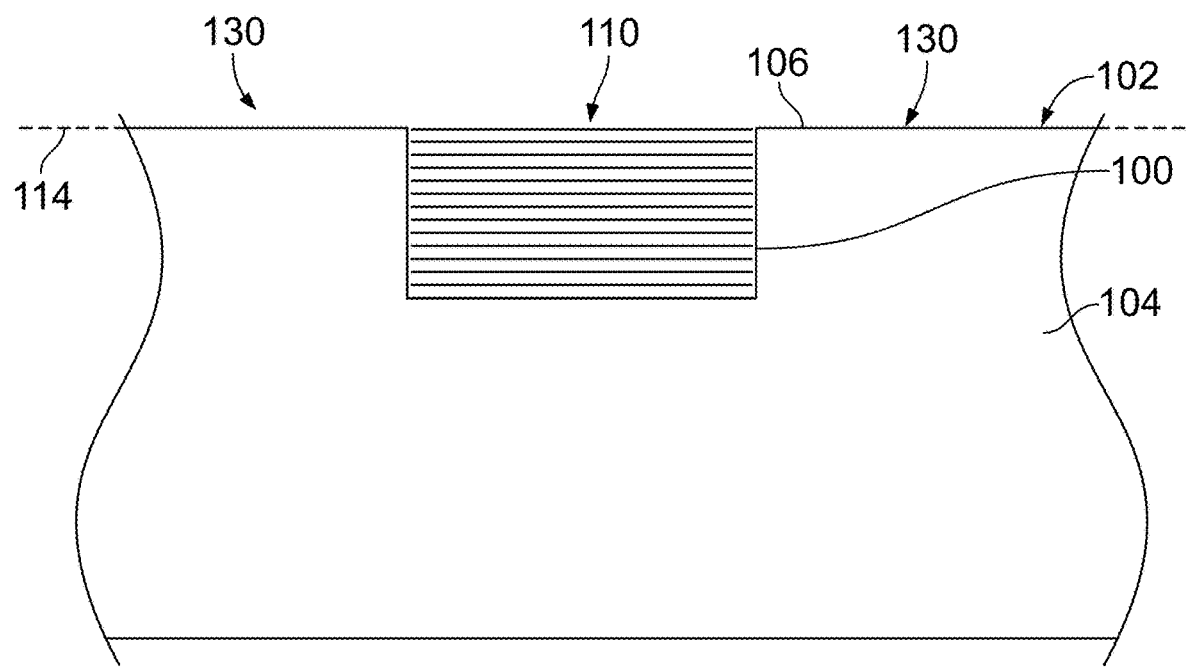
FIG. 3 illustrates a lateral view of the material trimmed to a plane of an exposed surface of the BAJ, according to an example of the present disclosure.

FIG. 3 illustrates a lateral view of the material 110 trimmed to a plane 114 of the exposed surface 106 of the BAJ 102, according to an example of the present disclosure. After curing, resin flash 130 is removed, such as by trimming, and the over-filled portion of the material 110 (which previously extended over the plane 114) is locally sand cured, such as via MMS 5047 Type 1 with 220 grit sandpaper until the material 110 is flush with the exposed surface 106, which provides a tool sheet and profile.

Figure 4:
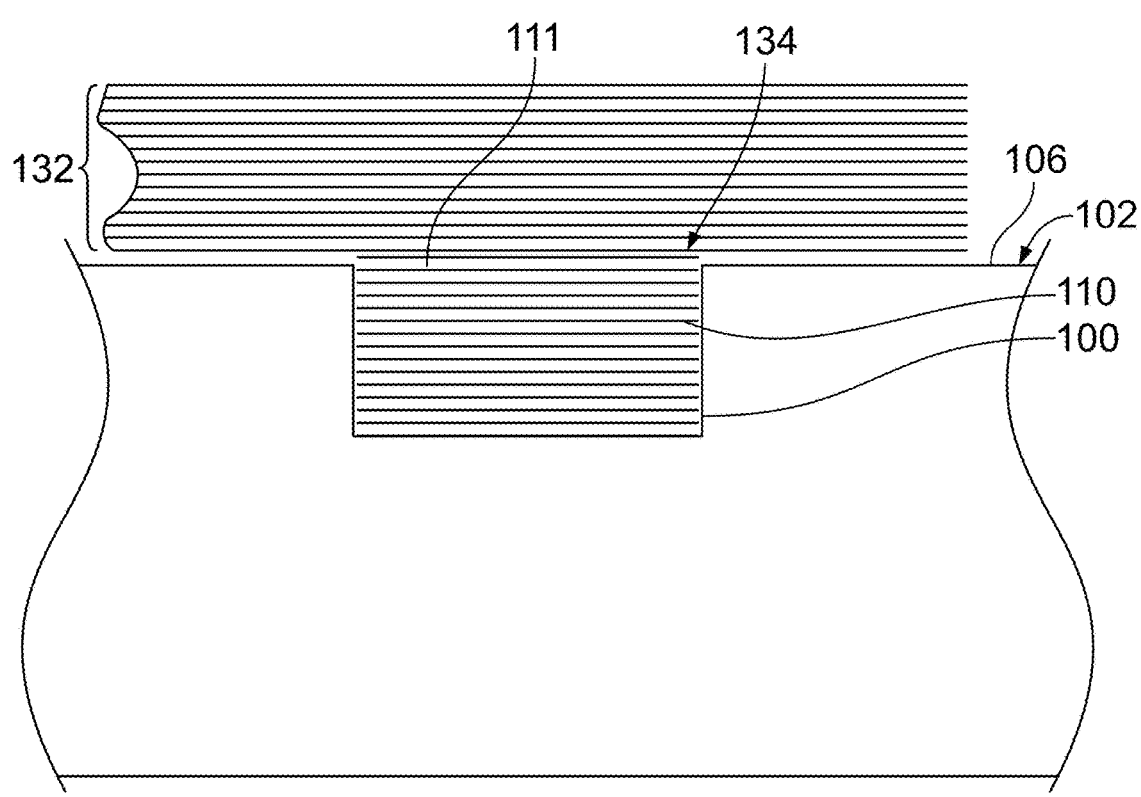
FIG. 4 illustrates a lateral view of a part disposed over the material within the cutter relief groove of the BAJ, according to an example of the present disclosure.

FIG. 4 illustrates a lateral view of a part 132 disposed over the material 110 within the cutter relief groove 100 of the BAJ 102, according to an example of the present disclosure. The part 132 lays over portions of the exposed surface 106 of the BAJ 102, as well as an exposed surface 111 of the material 110.

As shown in FIG. 4, part fabrication per specification and work order instructions can proceed. For example, the part 132 is laid-up and cured on the BAJ 102. In at least one example, release agent is applied to the material 110 (such as applying release agent to BMI before the part 132 is laid-up). In at least one example, the BAJ 102 also includes cured MMS 5047 Type 1.

Figure 5:
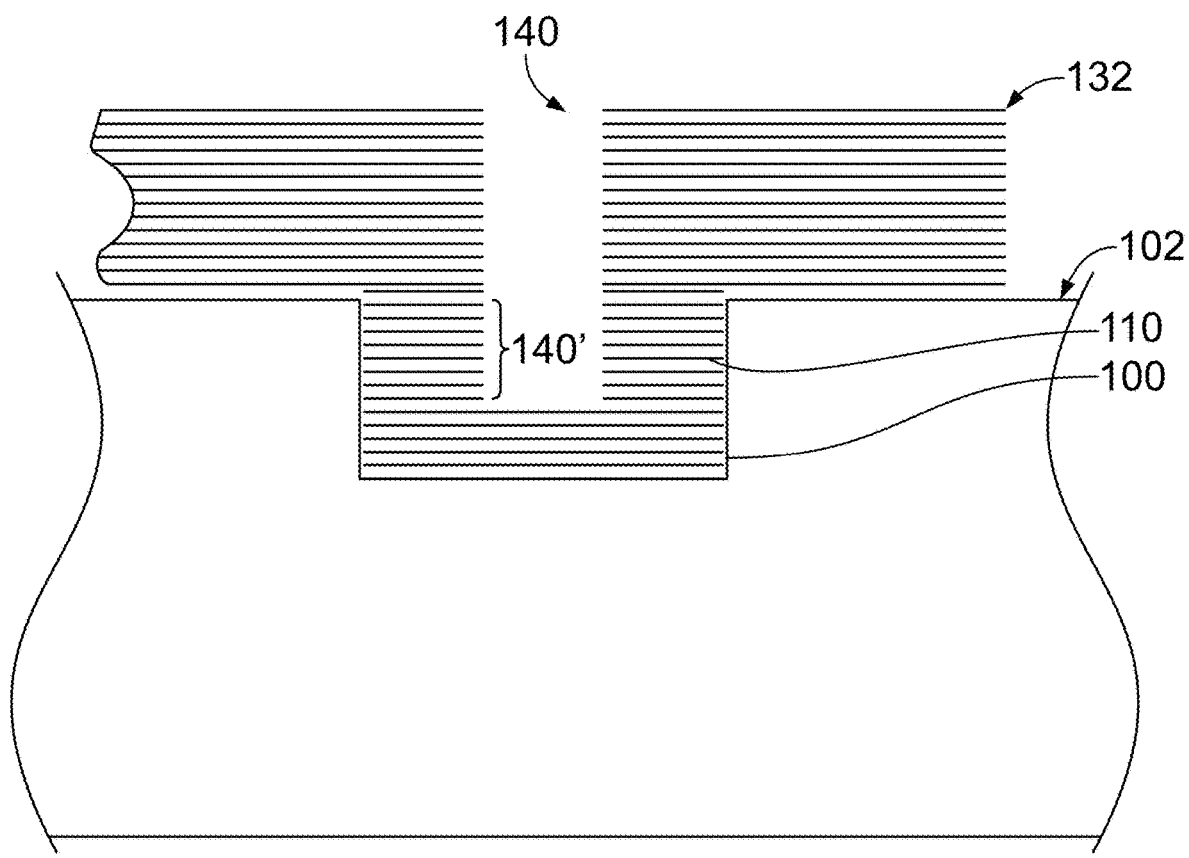
FIG. 5 illustrates a lateral view of a groove formed in the part and the material, according to an example of the present disclosure.

FIG. 5 illustrates a lateral view of a groove 140 formed in the part 132 and the material 110, according to an example of the present disclosure. As shown in FIG. 5, the part 132 is trimmed. At least a portion of the material 110 (such as BMI) is also trimmed, thereby forming the groove 140, which extends through the part 132 and the material 1104. In at least one example, the part 132 and the material 110 can be trimmed with a PS 14111 router.

Figure 6:
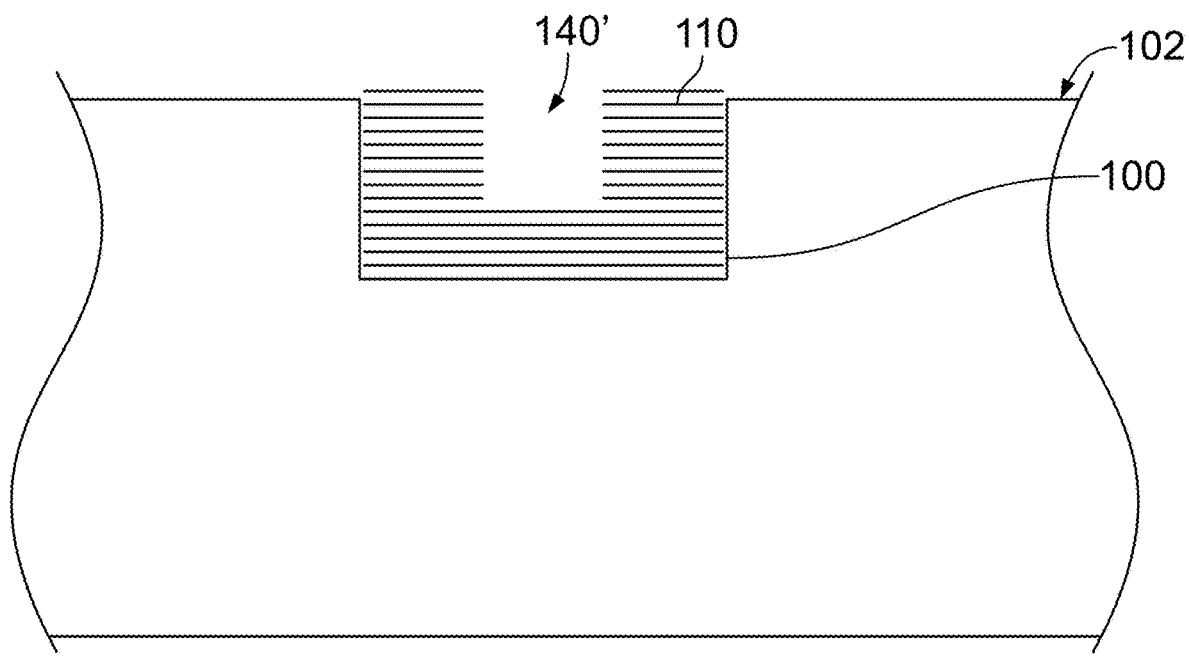
FIG. 6 illustrates a lateral view of the material including a sub-groove after the part is removed from the BAJ, according to an example of the present disclosure.

FIG. 6 illustrates a lateral view of the material 110 including a sub-groove 140' after the part 132 (shown in FIGS. 4 and 5) is removed from the BAJ 102, according to an example of the present disclosure. The sub-groove 140' is a portion of the groove 140 (shown in FIG. 5) extending through the material 110.

Figure 7:
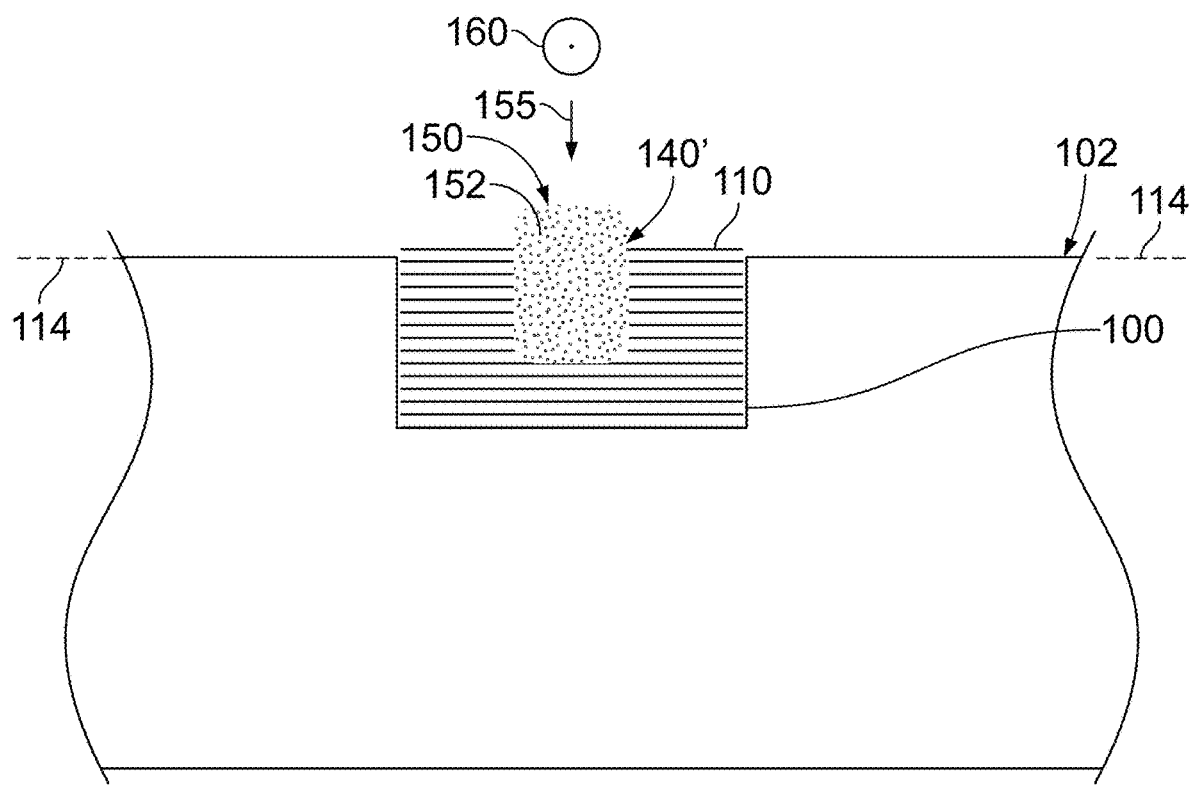
FIG. 7 illustrates a lateral view of preg material deposited into the sub-groove, according to an example of the present disclosure.

FIG. 7 illustrates a lateral view of preg material 150 deposited into the sub-groove 140', according to an example of the present disclosure. Examples of the preg material 150 include MMS 5024 Type 1 or Type 2 (HEY 977-3, AS-4 Unidirectional). As shown in FIG. 7, layers of preg material 150 are debulked together, cut into strips (such as by using an ultrasonic ply cutter), packed down in the direction of arrow 155 by a roller wheel 160, and vacuum debulked into the groove 140'. As shown, the groove 140' is over-filled with the preg material 150, such that the preg material 150 includes a portion 152 extending over the plane 114 of the BAJ 102.

Figure 8:
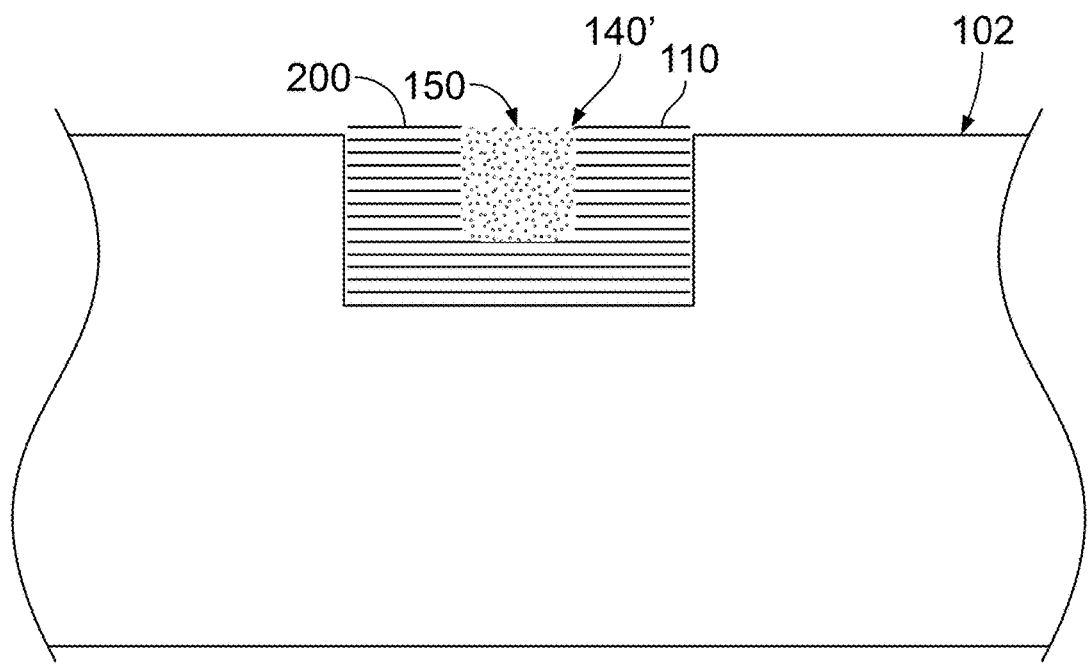
FIG. 8 illustrates a lateral view of the preg material flush with exposed surfaces of the material and the BAJ, according to an example of the present disclosure.

FIG. 8 illustrates a lateral view of the preg material 150 flush with exposed surfaces of the material 110 and the BAJ 102, according to an example of the present disclosure. As shown in FIG. 8, the preg material 150 is shaved (such as by cutting tool) to be flush to the exposed surfaces, thereby removing excess material. Release agent 200 can be then be applied over the preg material 150, the material 110, and the BAJ 102, and another part (such as another part 132 shown in FIG. 4), can be laid up and cured on the BAJ 102, as described herein. A groove can be formed in the components, and the process repeated, as described.

Further, the disclosure comprises examples according to the following clauses:

Clause 1. A method for preparing a bond assembly jig (BAJ), comprising:
 forming a cutter relief groove in the BAJ;
 filling the cutter relief groove of the BAJ with a material; and
 curing the material after said filling.

Clause 2. The method of Clause 1, wherein the material comprises a bismaleimide (BMI) resin.

Clause 3. The method of Clauses 1 or 2, wherein the material does not comprise Epocast material.

Clause 4. The method of any of Clauses 1-3, wherein the cutter relief groove extends from an exposed surface of the BAJ into a main body of the BAJ.

Clause 5. The method of any of Clauses 1-4, further comprising cleaning the cutter relief groove with a solvent before said filling.

Clause 6. The method of any of Clauses 1-5, wherein the material comprises a plurality of overlaid strips.

Clause 7. The method of any of Clauses 1-6, wherein said filling comprises overfilling the cutter relief groove with the material.

Clause 8. The method of any of Clauses 1-7, further comprising, before said curing, covering an exposed surface of the material with a release film and a caul sheet.

Clause 9. The method of Clause 8, further comprising sealing outer perimeter edges of the caul sheet with a tape.

Clause 10. The method of any of Clauses 1-9, further comprising laying up a part on the BAJ after said curing.

Clause 11. The method of Clause 10, further comprising forming a groove in the part and the material, wherein the portion of the groove formed in the material provides a sub-groove.

Clause 12. The method of Clause 11, further comprising removing the part from the BAJ after said forming the groove.

Clause 13. The method of Clause 12, further comprising depositing preg material into the sub-groove after said removing.

Clause 14. A method for preparing a bond assembly jig (BAJ), comprising:
- forming a cutter relief groove in the BAJ, wherein the cutter relief groove extends from an exposed surface of the BAJ into a main body of the BAJ;
- cleaning the cutter relief groove with a solvent;
- after said cleaning, filling the cutter relief groove of the BAJ with a material, wherein the material comprises a bismaleimide (BMI) resin;
- covering an exposed surface of the material with a release film and a caul sheet;
- curing the material after said filling after said covering; and
- laying up a part on the BAJ after said curing.

Clause 15. The method of Clause 14, wherein the material does not include Epocast material.

Clause 16. The method of Clauses 14 or 15, wherein the material comprises a plurality of overlaid strips.

Clause 17. The method of any of Clauses 14-16, wherein said filling comprises overfilling the cutter relief groove with the material.

Clause 18. The method of any of Clauses 14-17, further comprising sealing outer perimeter edges of the caul sheet with a tape.

Clause 19. The method of any of Clauses 14-18, further comprising:
- forming a groove in the part and the material, wherein the portion of the groove formed in the material provides a sub-groove;
- removing the part from the BAJ after said forming the groove; and
- depositing preg material into the sub-groove after said removing.

Clause 20. A method for preparing a bond assembly jig (BAJ), comprising:
- forming a cutter relief groove in the BAJ, wherein the cutter relief groove extends from an exposed surface of the BAJ into a main body of the BAJ;
- cleaning the cutter relief groove with a solvent;
- after said cleaning, over-filling the cutter relief groove of the BAJ with a material, wherein the material comprises a plurality of overlaid strips formed of bismaleimide (BMI) resin;
- covering an exposed surface of the material with a release film and a caul sheet;
- sealing outer perimeter edges of the caul sheet with a tape;
- curing the material after said filling after said covering;
- laying up a part on the BAJ after said curing;
- forming a groove in the part and the material, wherein the portion of the groove formed in the material provides a sub-groove;
- removing the part from the BAJ after said forming the groove; and
- depositing preg material into the sub-groove after said removing.

As described herein, examples of the present disclosure provide an improved method for preparing a BAJ. Further, examples of the present disclosure provide an efficient and effective method for forming a part with a BAJ.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A method for preparing a bond assembly jig (BAJ), comprising:
   forming a cutter relief groove in the BAJ;
   filling the cutter relief groove of the BAJ with a material;
   curing the material after said filling; and
   laying up a part on the BAJ after said curing.

2. The method of claim 1, wherein the material comprises a bismaleimide (BMI) resin.

3. The method of claim 1, wherein the material does not comprise Epocast material.

4. The method of claim 1, wherein the cutter relief groove extends from an exposed surface of the BAJ into a main body of the BAJ.

5. The method of claim 1, further comprising cleaning the cutter relief groove with a solvent before said filling.

6. The method of claim 1, wherein the material comprises a plurality of overlaid strips.

7. The method of claim 1, wherein said filling comprises overfilling the cutter relief groove with the material.

8. The method of claim 1, further comprising, before said curing, covering an exposed surface of the material with a release film and a caul sheet.

9. The method of claim 8, further comprising sealing outer perimeter edges of the caul sheet with a tape.

10. The method of claim 1, further comprising forming a groove in the part and the material, wherein the portion of the groove formed in the material provides a sub-groove.

11. The method of claim 10, further comprising removing the part from the BAJ after said forming the groove.

12. The method of claim 11, further comprising depositing preg material into the sub-groove after said removing.

13. A method for preparing a bond assembly jig (BAJ), comprising:
    forming a cutter relief groove in the BAJ, wherein the cutter relief groove extends from an exposed surface of the BAJ into a main body of the BAJ;
    cleaning the cutter relief groove with a solvent;
    after said cleaning, filling the cutter relief groove of the BAJ with a material, wherein the material comprises a bismaleimide (BMI) resin;
    covering an exposed surface of the material with a release film and a caul sheet;
    curing the material after said filling after said covering; and
    laying up a part on the BAJ after said curing.

14. The method of claim 13, wherein the material does not include Epocast material.

15. The method of claim 13, wherein the material comprises a plurality of overlaid strips.

16. The method of claim 13, wherein said filling comprises overfilling the cutter relief groove with the material.

17. The method of claim 13, further comprising sealing outer perimeter edges of the caul sheet with a tape.

18. The method of claim 13, further comprising:
    forming a groove in the part and the material, wherein the portion of the groove formed in the material provides a sub-groove;
    removing the part from the BAJ after said forming the groove; and
    depositing preg material into the sub-groove after said removing.

19. A method for preparing a bond assembly jig (BAJ), comprising:
    forming a cutter relief groove in the BAJ, wherein the cutter relief groove extends from an exposed surface of the BAJ into a main body of the BAJ;
    cleaning the cutter relief groove with a solvent;
    after said cleaning, over-filling the cutter relief groove of the BAJ with a material, wherein the material comprises a plurality of overlaid strips formed of bismaleimide (BMI) resin;
    covering an exposed surface of the material with a release film and a caul sheet;
    sealing outer perimeter edges of the caul sheet with a tape;
    curing the material after said filling after said covering;
    laying up a part on the BAJ after said curing;
    forming a groove in the part and the material, wherein the portion of the groove formed in the material provides a sub-groove;
    removing the part from the BAJ after said forming the groove; and
    depositing preg material into the sub-groove after said removing.

20. A method for preparing a bond assembly jig (BAJ), comprising:
    forming a cutter relief groove in the BAJ;
    filling the cutter relief groove of the BAJ with a material;
    covering an exposed surface of the material with a release film and a caul sheet; and
    curing the material after said filling and said covering.

* * * * *